(12) United States Patent  (10) Patent No.: US 9,182,144 B2
Chen  (45) Date of Patent: Nov. 10, 2015

(54) HOT AIR BLOWER

(71) Applicant: Wei-Long Chen, Taichung (TW)

(72) Inventor: Wei-Long Chen, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 511 days.

(21) Appl. No.: 13/629,729

(22) Filed: Sep. 28, 2012

(65) Prior Publication Data

US 2013/0230816 A1 Sep. 5, 2013

(30) Foreign Application Priority Data

Mar. 2, 2012 (TW) .............................. 101106960 A

(51) Int. Cl.
*F24H 3/04* (2006.01)
*F23D 14/46* (2006.01)
*A45D 20/12* (2006.01)
*A45D 20/10* (2006.01)
*A45D 20/06* (2006.01)
*F24H 3/02* (2006.01)
*F24H 9/18* (2006.01)
*F24H 9/00* (2006.01)
*F23D 1/00* (2006.01)

(52) U.S. Cl.
CPC .. *F24H 3/02* (2013.01); *F23D 1/00* (2013.01); *F24H 3/0488* (2013.01); *F24H 9/0063* (2013.01); *F24H 9/0073* (2013.01); *F24H 9/18* (2013.01); *F24H 9/1863* (2013.01); *F24H 3/0423* (2013.01)

(58) Field of Classification Search
None
See application file for complete search history.

(56) References Cited

U.S. PATENT DOCUMENTS

| | | | | |
|---|---|---|---|---|
| 3,610,537 A * | 10/1971 | Nakagawa et al. | ........ | 239/419.3 |
| 3,741,166 A * | 6/1973 | Bailey | .............. | 122/23 |
| 4,286,945 A * | 9/1981 | Vosper et al. | .................. | 432/29 |
| 4,726,767 A * | 2/1988 | Nakajima | ..................... | 432/222 |
| 4,903,416 A * | 2/1990 | Levin et al. | ........................ | 34/97 |
| 4,995,171 A * | 2/1991 | Yoshinaga et al. | ................. | 34/97 |
| 5,009,592 A * | 4/1991 | Roldan et al. | .................. | 432/222 |
| 5,155,925 A * | 10/1992 | Choi | ................................... | 34/97 |
| 5,217,578 A * | 6/1993 | Taciuk et al. | .................. | 202/100 |
| 5,344,314 A * | 9/1994 | Zagoroff et al. | .............. | 432/222 |
| 5,399,085 A * | 3/1995 | Taylor | ............................ | 431/353 |
| 5,608,975 A * | 3/1997 | Hsu | ................................... | 34/97 |
| 5,839,891 A * | 11/1998 | Cook | ................................ | 431/7 |
| 5,857,262 A * | 1/1999 | Bonnema et al. | .................. | 34/97 |
| 6,238,207 B1 * | 5/2001 | Sarkinen | ........................ | 431/353 |
| 6,983,550 B1 * | 1/2006 | Lin | ..................................... | 34/96 |
| 7,065,899 B2 | 6/2006 | Lin | ..................................... | 34/97 |
| 7,913,416 B1 * | 3/2011 | Scieri | .................................. | 34/97 |
| 2004/0216322 A1 * | 11/2004 | Collier et al. | ...................... | 34/97 |

(Continued)

*Primary Examiner* — Gregory Huson
*Assistant Examiner* — Eric Gorman
(74) *Attorney, Agent, or Firm* — Alan D. Kamrath; Kamrath IP Lawfirm, P.A.

(57) ABSTRACT

A hot air blower includes a shell including a fan mechanism, a combustion device, a vane mechanism, and a flame protector disposed therein. The vane mechanism includes a clipping seat and a plurality of guiding vanes extended thereon. The plurality of guiding vanes extend obliquely and prevents the air passing through the vane mechanism from generating turbulence. The clipping seat and the flame protector form a half-closed combustion chamber therebetween. Heat in the half-closed combustion chamber causes a thermal expansion of the air and, thereby increasing a speed and a volume of the air passing the guiding vanes of the vane mechanism. The heated air is discharged from an external flow tube and which controls a heating range of an area of the hot air blower.

15 Claims, 8 Drawing Sheets

(56) References Cited

U.S. PATENT DOCUMENTS

| | | | |
|---|---|---|---|
| 2006/0070255 A1* | 4/2006 | Kokuo et al. | 34/96 |
| 2006/0236557 A1* | 10/2006 | Bousfield | 34/96 |
| 2009/0000141 A1* | 1/2009 | Gross et al. | 34/90 |
| 2009/0034945 A1* | 2/2009 | Teraoka | 392/379 |
| 2009/0226852 A1* | 9/2009 | Feese et al. | 431/9 |
| 2012/0178035 A1* | 7/2012 | Chen et al. | 431/354 |
| 2012/0268936 A1* | 10/2012 | Pickard et al. | 362/249.02 |
| 2013/0228232 A1* | 9/2013 | Chen | 137/335 |
| 2014/0041559 A1* | 2/2014 | Hirano | 110/313 |
| 2014/0261111 A1* | 9/2014 | Cant et al. | 110/188 |
| 2014/0290087 A1* | 10/2014 | Weatherly | 34/98 |
| 2015/0082777 A1* | 3/2015 | Tsumagari et al. | 60/320 |

\* cited by examiner

HOT AIR BLOWER

BACKGROUND OF THE INVENTION

1. Field of the Invention

The present invention relates to a hot air blower and, particularly, to a hot air blower improved to blow air in a more focused and less spread manner and to allow a user to effectively control the extent of airflow.

2. Description of the Related Art

U.S. Pat. No. 7,065,899 discloses a gas hot air gun including a main body, an air blower, an ignition device, a nozzle and a switch set. The main body includes a barrel, a handle, a heating chamber and a mixing chamber on the inner front of the barrel. A battery set and a gas can are inside the handle. One end of the nozzle is connected to the gas can. The switch set includes a power switch and an ignition switch. Users press the power switch and have gas spray out from the nozzle into the heating chamber to generate heat. The blower sends out hot air in the heating chamber out of the main body. A metal slice to regulate the direction of air and a catalyst to avoid flames from coming out of the nozzle area are inside the heating chamber.

This patented gas hot air gun can be further improved to have better control of the gas flow rate and the heating temperatures. There may be situations in which high gas flow rate inhibits a flame from being ignited. Additionally, when gas flow rate and oxygen supply rate are increased in order to achieve a higher heating temperature, the increased supply of oxygen proportionally causes air to travel at a higher speed as the gas hot air gun includes an air passage with a fixed cross sectional area. However, air can blow out a flame when the burning speed of oxygen is slower or the density of gas is low.

The present invention is, therefore, intended to obviate or at least alleviate the problems encountered in the prior art.

SUMMARY OF THE INVENTION

According to the present invention, a hot air blower includes a shell, a fuel canister, a fan mechanism, a combustion device, a vane mechanism, a flame protector, and an external flow tube. The fuel canister, the fan mechanism, the combustion device, the vane mechanism, and the flame protector are disposed within the shell. The fan mechanism blows air. The combustion device includes a burning end. The vane mechanism is disposed in a position locating the combustion device between the fan mechanism and the vane mechanism. The vane mechanism includes a clipping seat and a plurality of guiding vanes. The plurality of guiding vanes extends obliquely. The obliquely disposed plurality of guiding vanes prevent the air passing through the vane mechanism from generating turbulence to achieve a flow-regulating effect. The flame protector is disposed within the vane mechanism and hoods the burning end of the combustion device. The flame protector includes a lateral wall including a plurality of vents, and the air passing the vane mechanism is able to be expelled out of the plurality of vents. The clipping seat and the flame protector form a half-closed combustion chamber therebetween. Heat in the half-closed combustion chamber causes a thermal expansion of the air and, thereby, increasing a speed and a volume of the air passing the guiding vanes of the vane mechanism. The external flow tube is extended out of the shell. The heated air is discharged out of the hot air blower from the external flow tube which controls a heating range of an area of the hot air blower.

Other objects, advantages, and new features of the present invention will become apparent from the following detailed description of the invention when considered in conjunction with the accompanied drawings.

DETAILED DESCRIPTION OF THE PREFERRED EMBODIMENT

Figure 1:
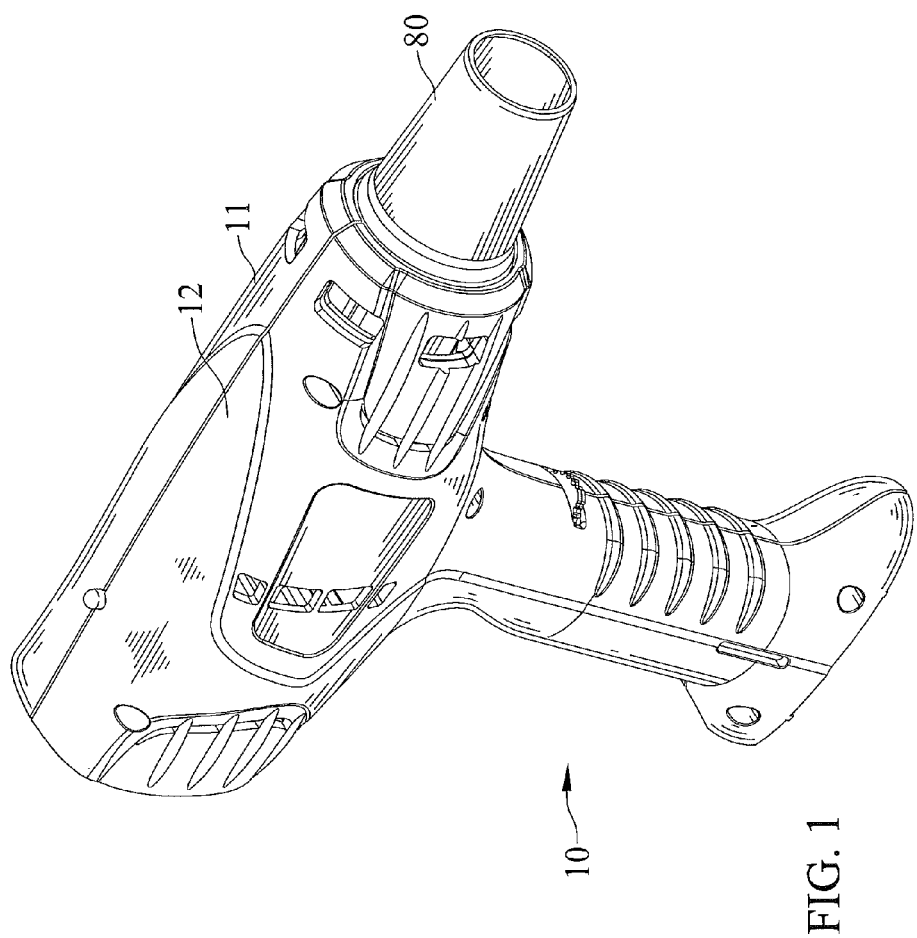
FIG. 1 is a perspective view of a hot air blower in accordance with the present invention.
Figure 2:
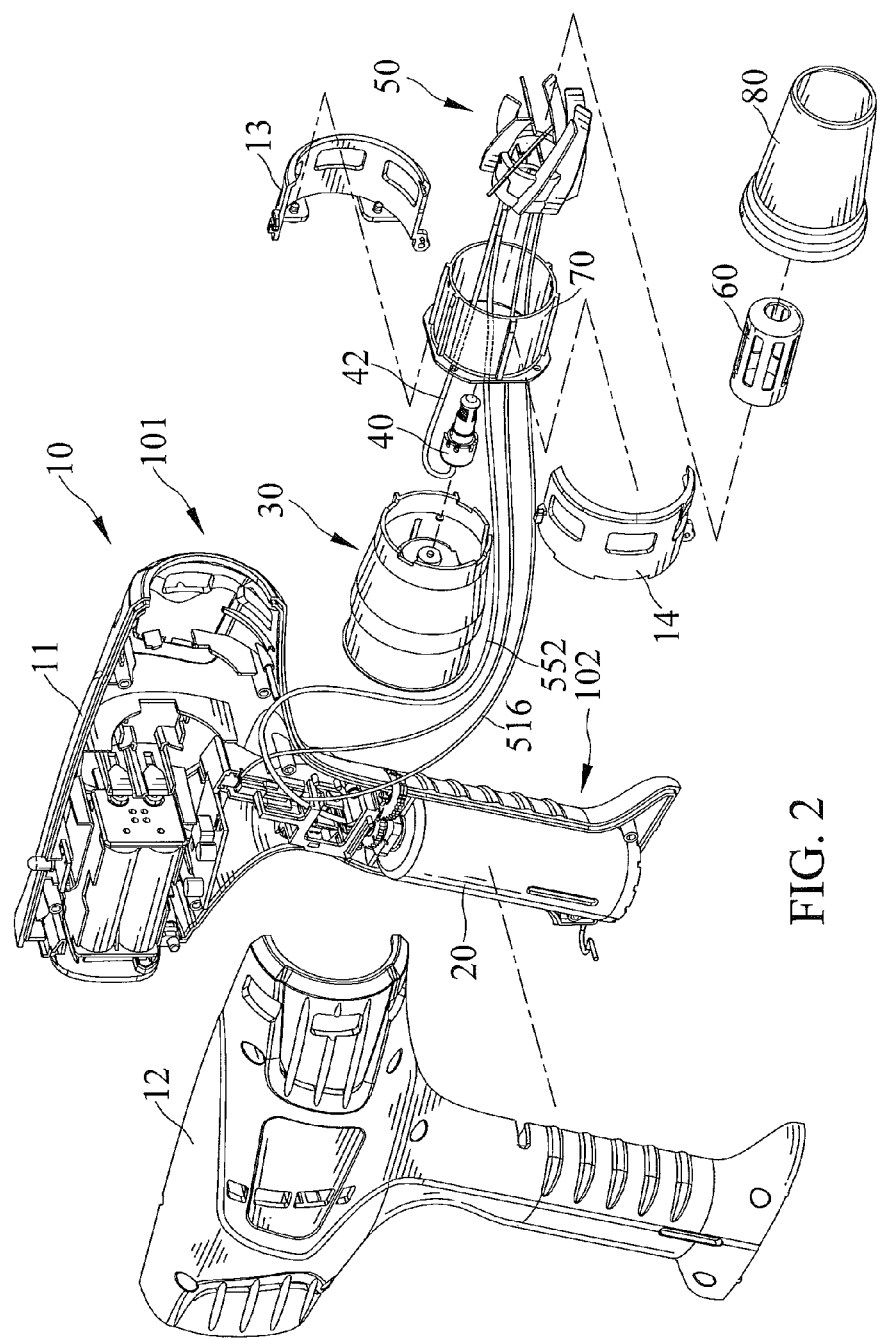
FIG. 2 is an exploded perspective view of the hot air blower of FIG. 1.
Figure 3:
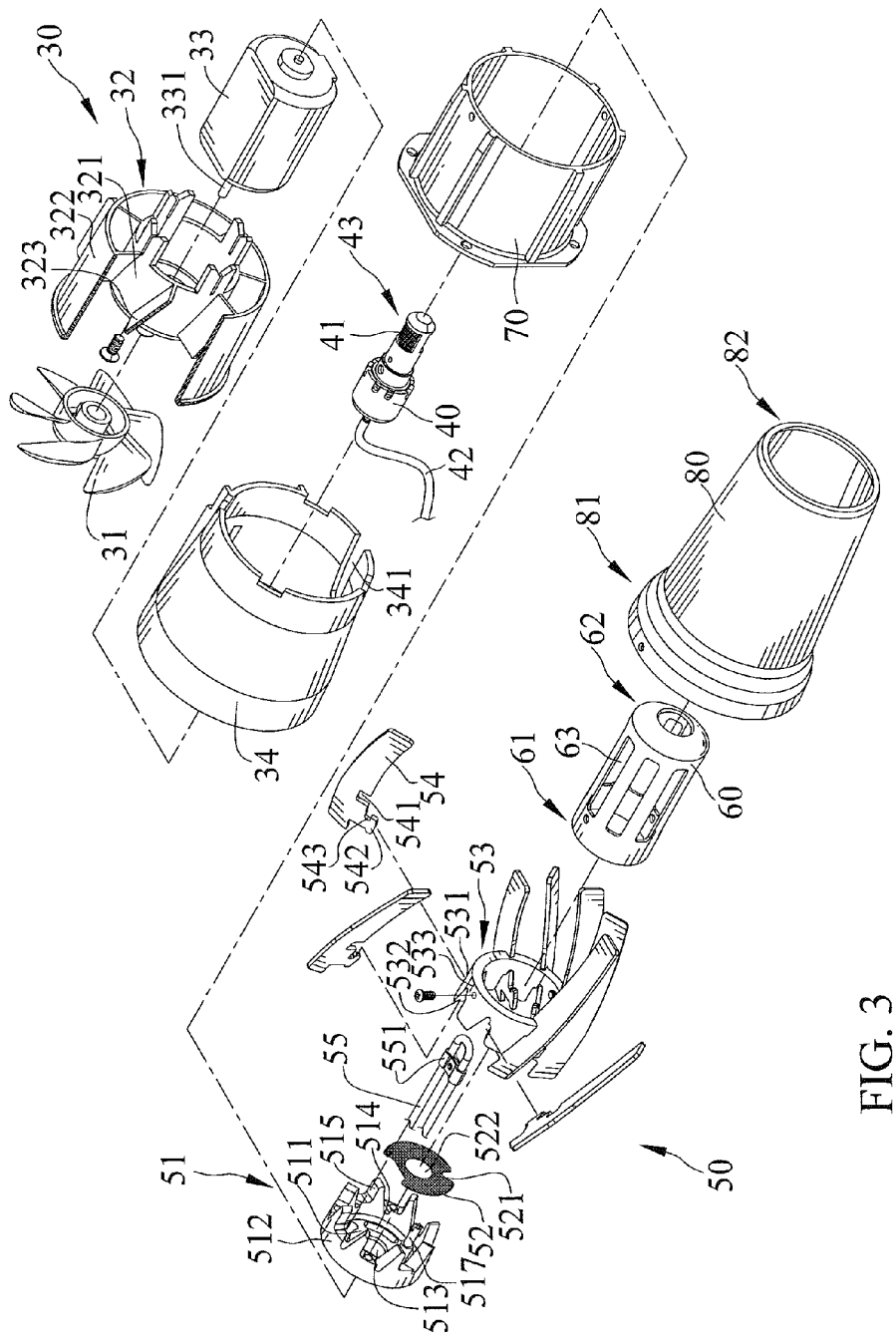
FIG. 3 is another exploded perspective view of the hot air blower of FIG. 1.
Figure 4:
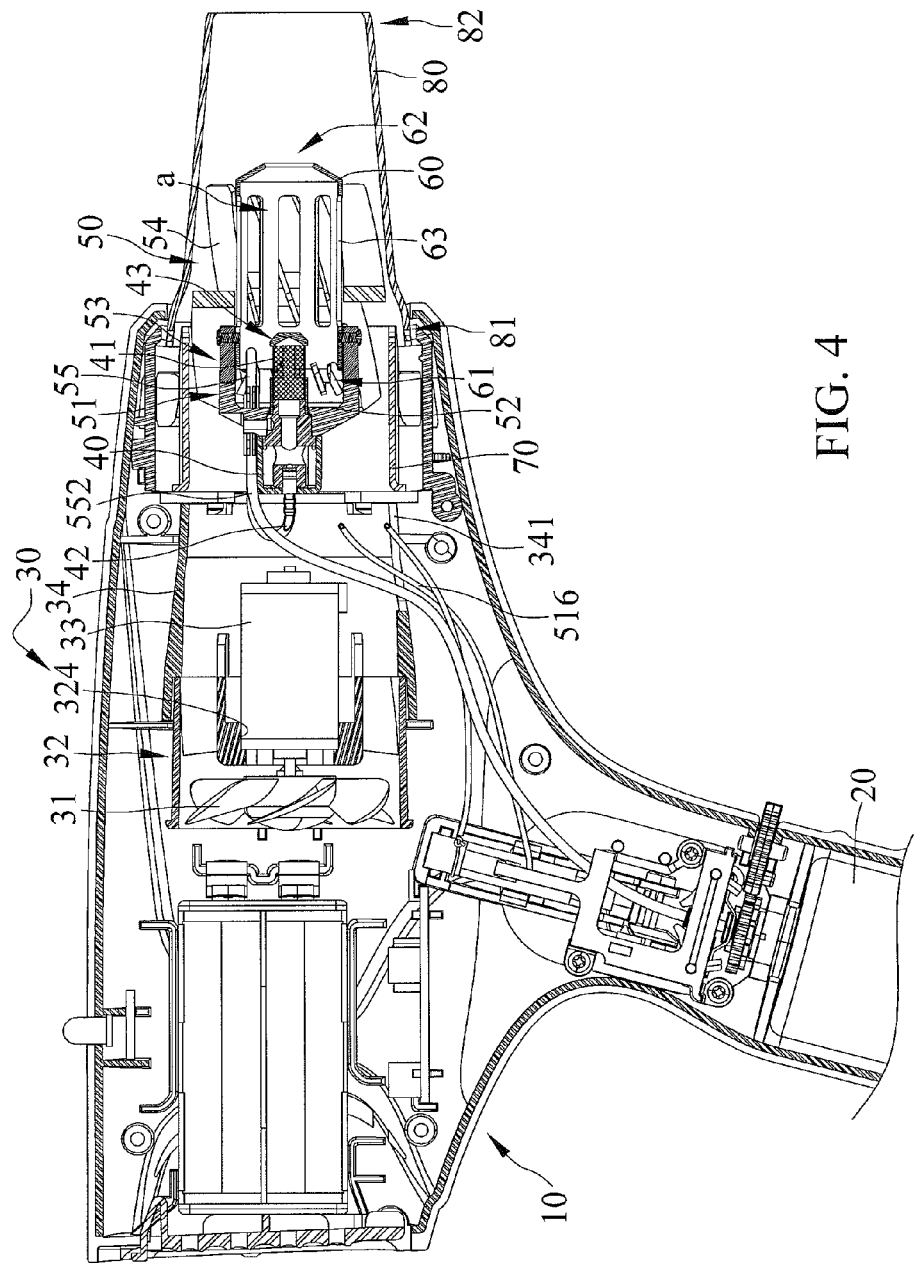
FIG. 4 is a cross-sectional view of the hot air blower of FIG. 1.
Figure 5:
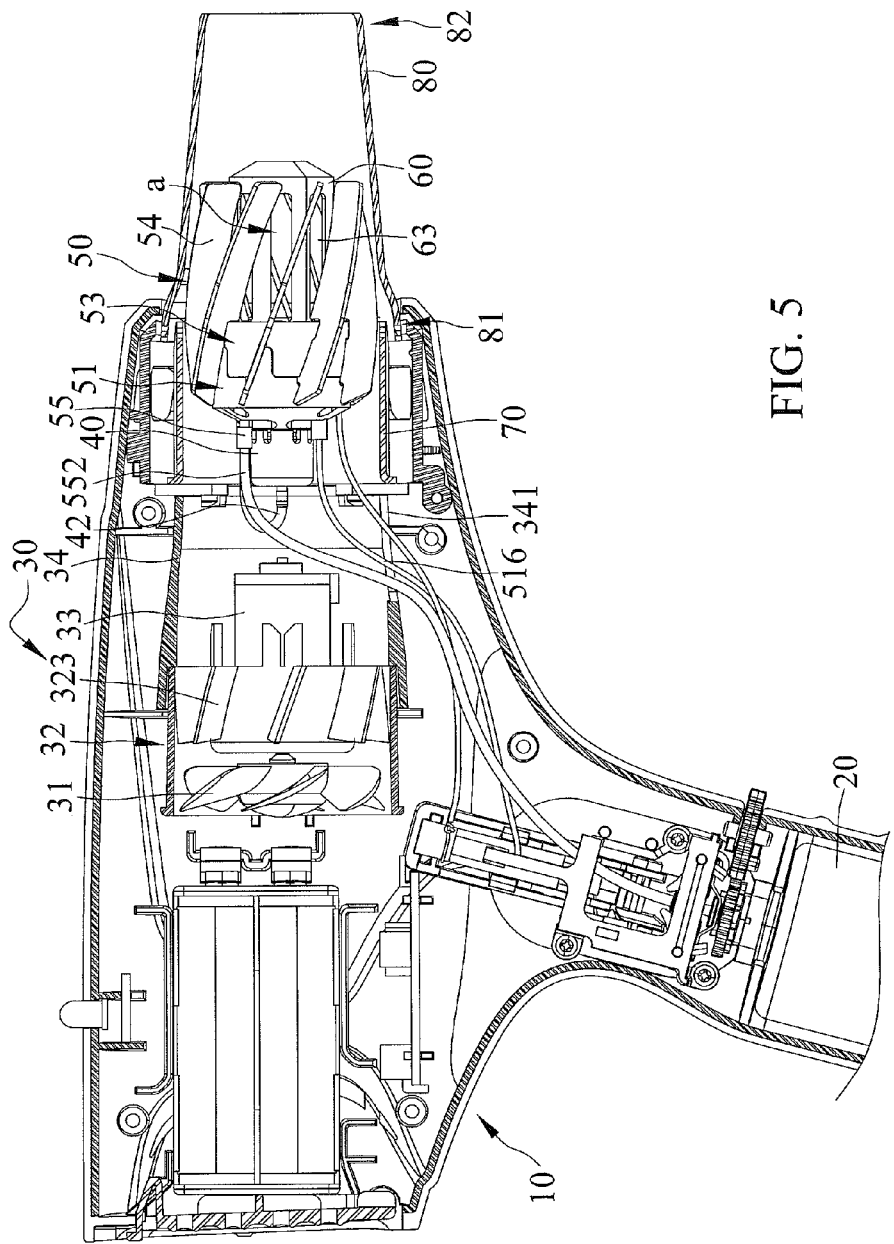
FIG. 5 is another cross sectional view of the hot air blower of FIG. 1.
Figure 6:
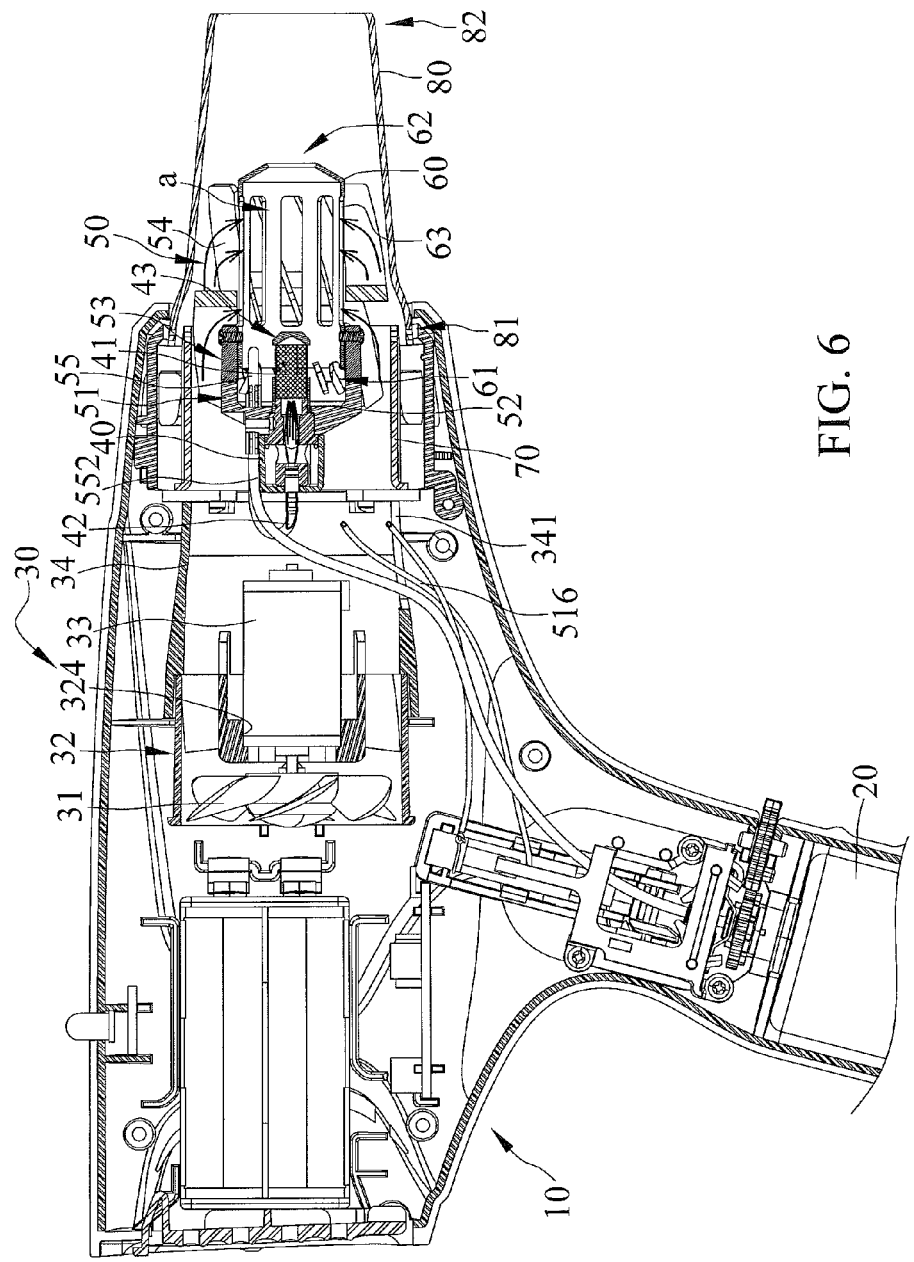
FIG. 6 is a cross-sectional view showing the hot air blower in operation.
Figure 7:
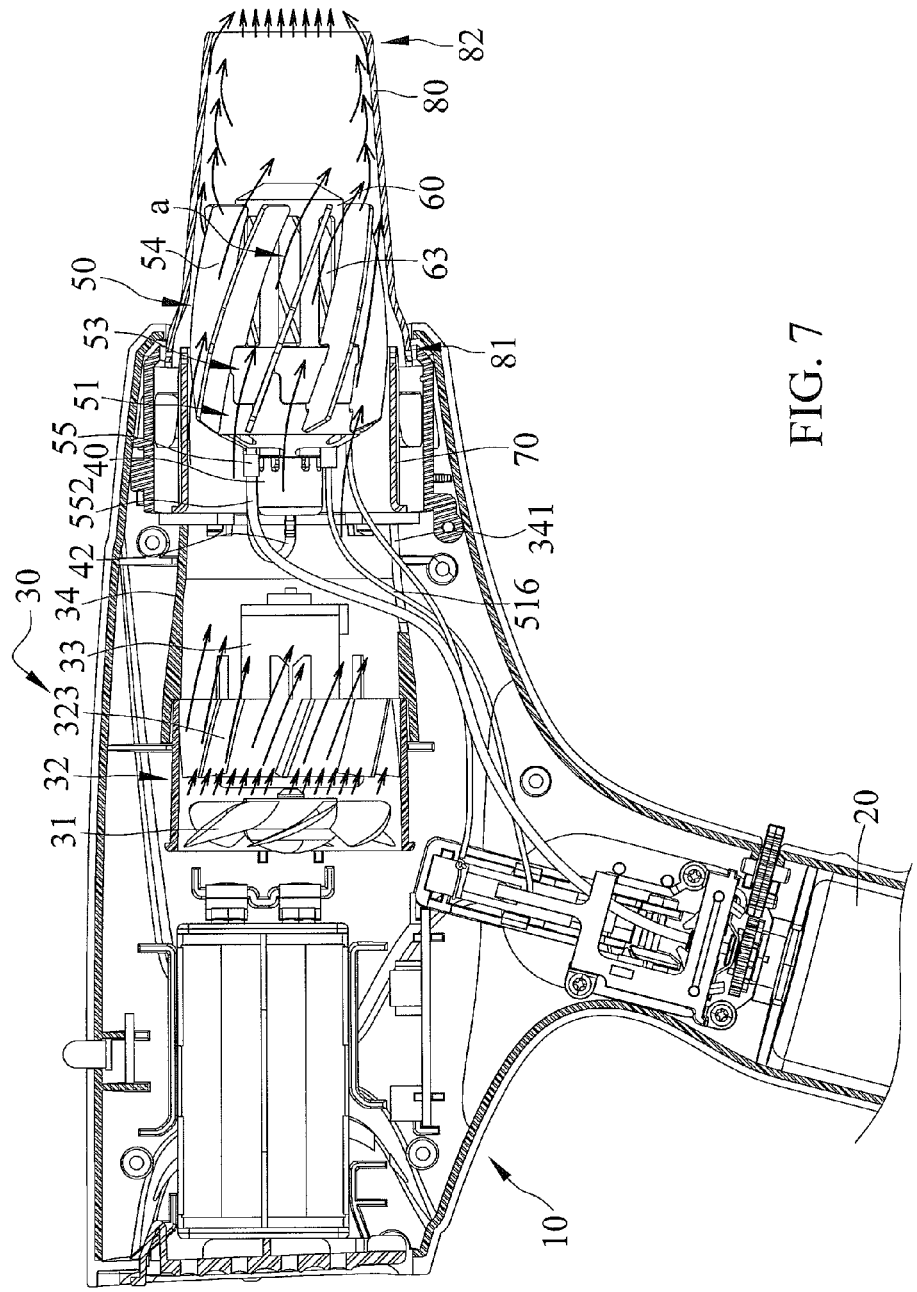
FIG. 7 is a cross-sectional view showing the hot air blower in operation.
Figure 8:
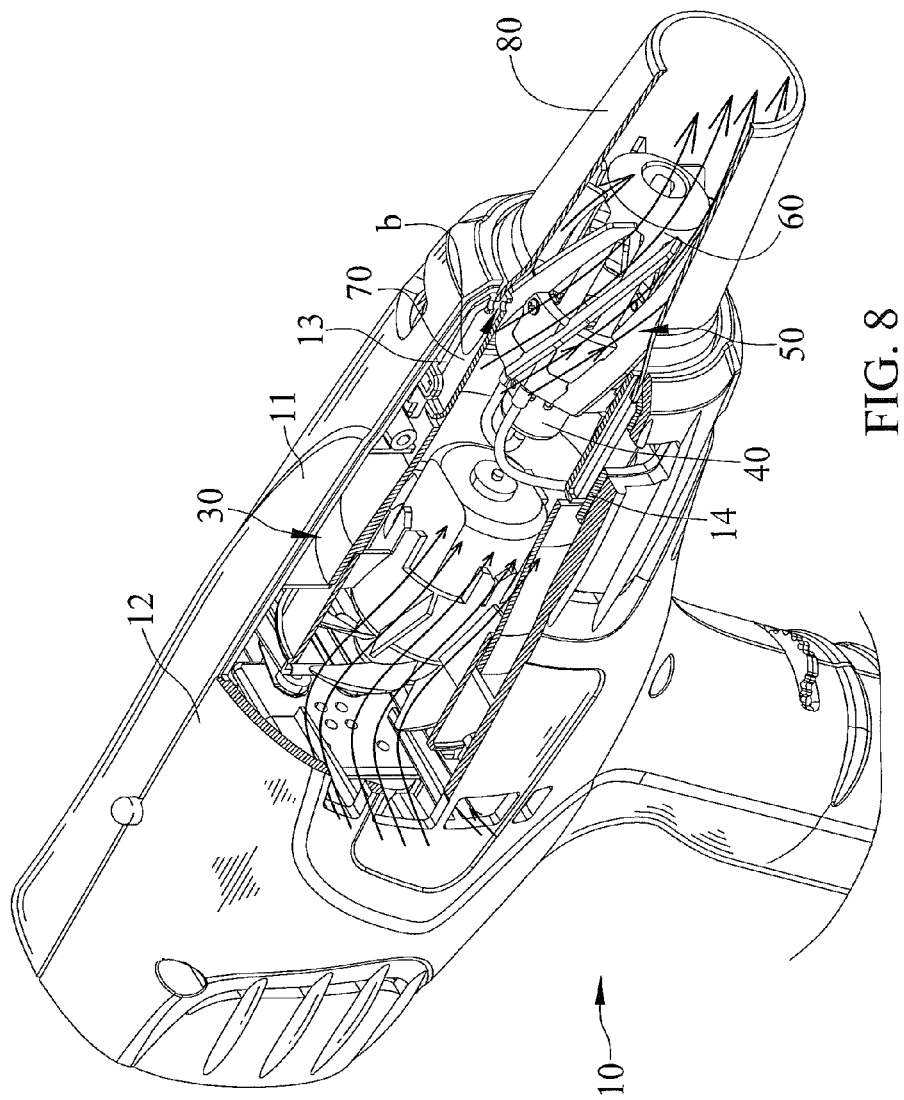
FIG. 8 is a perspective view showing the hot air blower in operation.

FIGS. 1 through 8 show a hot air blower in accordance with the present invention. The hot air blower includes a shell 10, a fuel canister 20, a fan mechanism 30, a combustion device 40, a vane mechanism 50, a flame protector 60, and an external flow tube 80. The shell 10 includes first and second shells 11 and 12 symmetrically joined to each other. The first and second shells 11 and 12 include first and second clamping collars 13 and 14 disposed therein. The shell 10 is substantially T-shaped including first and second extensions 101 and 102 transverse to each other. The fan mechanism 30, the combustion device 40, the vane mechanism 50, and the flame protector 60 are disposed in the first extension 101 of the shell 10. The fuel canister 20 is disposed in the second extension 102 of the shell 10.

The fuel canister 20, the fan mechanism 30, the combustion device 40, the vane mechanism 50, and the flame protector 60 are disposed within the shell 10.

The fan mechanism 30 blows air. The fan mechanism 30 includes a fan 31, a flow-regulating sleeve 32, a fan motor 33, and a shielding cover 34. The flow-regulating sleeve 32 includes a first end covering the fan 31. The flow-regulating sleeve 32 includes a second end including the fan motor 33 fixed thereto powering the fan 31. The shielding cover 34 includes an end attached to the flow-regulating sleeve 32. The flow-regulating sleeve 32 includes an annular internal wall 321 and an annular external wall 322 including a plurality of fins 323. The plurality of fins 323 extends obliquely on the internal wall 321 and radially from the internal wall 321 to the external wall 322. The internal wall 321 delimits a bore 324 including the fan motor 33 tightly fitted therein. The fan motor 33 includes a motor spindle 331, and the fan 31 is connected thereto. The fan 31 is rotated upon rotation of the motor spindle 331. The shielding cover 34 covers the fan motor 33.

The combustion device 40 includes a burning end 43. The combustion device 40 includes an end connecting with a first fuel line 42.

The vane mechanism 50 is disposed in a position locating the combustion device 40 between the fan mechanism 30 and the vane mechanism 50. The vane mechanism 50 includes a first clipping seat 51, a flow-regulating net 52, a second clipping seat, a plurality of guiding vanes 54, and a heating tube 55. The first clipping seat 51 includes a bottom side 511 including a first through hole 513 and a plurality of guide holes 514. The first through hole 513 is disposed in a central position. The plurality of guide holes 514 is disposed circumferentially around the first through hole 513. Furthermore, the combustion device 40 is insertably disposed through the first through hole 513. The bottom side 511 of the first clipping seat 51 includes an ignition wire 516. The ignition wire 516 is connected with an ignition device 517. The ignition device 517 is able to produce a flame. Additionally, the combustion device 40 includes a catalyst net 41 disposed therein preventing the flame from extending out of the combustion device 40. The flow-regulating net 52 is disposed on the first clipping seat 51. The flow-regulating net 52 includes a plurality of meshes 521. The flow-regulating net 52 includes a second through hole 522. The second through hole 522 corresponds to the first through hole 513. The combustion device 40 is insertably disposed through the second through hole 522. The flow-regulating net 52 is made of metal. One of the first and second clipping seats 51 and 53 includes a first lateral side 512 extended along a circumference of the bottom side 511 and including a plurality of protruded first clamping sections 515. The other of the first and second clipping seats 51 and 53 includes a second lateral side 531 extended annularly and including a plurality of recessed second clamping sections 532 and defining an embedding wall 533. The first and second clipping seats 51 and 53 together hold the plurality of guiding vanes 54. Each of the plurality of guiding vanes 54 includes a recessed hook section 541 and an anti-disengagement protruded hook section 542 on a same side and adjacent to each other. The recessed hook sections 541 of the plurality of guiding vanes 54 are hooked onto the embedding wall 533. The first and second clipping seats 51 and 53 are connected together with the plurality of protruded first clamping sections 515 correspondingly engaging with the plurality of recessed second clamping sections 532. The anti-disengagement protruded hook sections 542 of the plurality of guiding vane 54 are clamped between the plurality of protruded first clamping sections 515 and the plurality of recessed second clamping sections 532 to prevent disengagement from the first and second clipping seats 51 and 53. Each of the plurality of guiding vanes 54 also includes a recessed limiting section 543 and includes the recessed limiting section 543, the recessed hook section 541, and the anti-disengagement protruded hook section 542 on the same side and adjacent to one another. The vane mechanism 50 includes the heating tube 55 mounted on the first clipping seat 51. The heating tube 55 is U-shaped. The heating tube 55 includes an end including a fixing end 551. The heating tube 55 is insertably disposed through and includes the fixing end 551 fixed in one of the plurality of guide holes 514. The heating tube 55 includes two legs with one leg connecting with the first fuel line 42 and with the other leg connecting with a second fuel line 552 respectively. The heating tube 55 is disposed in front of the fan mechanism 30 and aside of the combustion device 40, with the combustion device 40 able to give off heat energy to the heating tube 55 and able to prevent fuel from becoming condensed and clogged therein. Additionally, the shielding cover 34 includes a lateral side including a cutout 341 allowing the ignition wire 516 and the second fuel line 552 to extend therethrough.

The air flows through the plurality of guide holes 514 and is regulated by the plurality of meshes 521 of the flow-regulating net 52. The flow-regulating net 52 limits a flow amount of the air passing the vane mechanism 50 per unit time to achieve a flow-regulating effect. The plurality of guiding vanes 54 extend obliquely between the first and second clipping seats 51 and 53. The obliquely disposed plurality of guiding vanes 54 prevent the air passing through the vane mechanism 50 from generating turbulence to achieve a flow-regulating effect.

The flame protector 60 is disposed within the vane mechanism 50 and hoods the burning end 43 of the combustion device 40. The flame protector 60 includes an end defining an open end 61 and another end defining an air exit end 62. The burning end 43 of the combustion device 40 is hooded in the open end 61 of the flame protector 60. The open end 61 of the flame protector 60 is fixed to the second clipping seat 53 of the vane mechanism 50. The flame protector 60 has an end fixed to the second lateral side 531 of the second clipping seat 53. In the embodiment, the second clipping seat 53 and the flame protector 60 are fixed together by a fastener engaging therebetween. Moreover, the second clipping seat 53 is disposed between the first clipping seat 51 and the flame protector 60. The flame protector 60 also includes a lateral wall including a plurality of vents 63, and the air passing the vane mechanism 50 is able to be expelled out of the plurality of vents 63. The plurality of vents 63 is circumferentially disposed on the flame protector 60 and is parallel to one another. Moreover, the first and second clipping seats 51 and 53 and the flame protector 60 form a half-closed combustion chamber a therebetween, and heat in the half-closed combustion chamber a would cause a thermal expansion of the air, thereby increasing a speed and a volume of the air passing the guiding vanes 54 of the vane mechanism 50.

Further, an internal flow tube 70 is disposed within the shell 10. The first and second clamping collars 13 and 14 hold the internal flow tube 70 fixed inside the shell 10. The combustion device 40 and the vane mechanism 50 are insertably disposed in the internal flow tube 70. The internal flow tube 70 is disposed between the fan mechanism 30 and the external flow tube 80 and keeps the air flowing therein. Additionally, the shielding cover 34 is disposed between the flow-regulating sleeve 32 and the internal flow tube 70.

The external flow tube 80 is extended out of the shell 10, and the heated air would be discharged out of the hot air blower from the external flow tube 80 and which controls a heating range of an area of the hot air blower. The external flow tube 80 includes a first end 81 fixed to an end of the internal flow tube 70 and a second end 82 extended out of the shell 10. Additionally, the combustion device 40 and the vane mechanism 50 are also insertably disposed in the external flow tube 80.

Furthermore, the internal and external flow tubes 70 and 80 form a gap b between junctions therebetween. The gap b causes a venturi effect allowing an increased amount of external air to flow therein. Furthermore, the gap b prevents impedance of circulation of the air avoiding the flame being put off, particularly when a user operates the hot air blower too close to an object to be heated.

In this hot air blower, the flame protector 60 is axially disposed within the vane mechanism 50, and the plurality of vents 63 allows the heated air in the half-closed combustion chamber a to flow thereout. The combustion device 40 and the vane mechanism 50 are insertably disposed in the internal flow tube 70, and the external flow tube 80 is extended out of the shell 10. The air can flow spirally, cold and hot air can be thoroughly mixed, and the heated air can be discharged out at a predetermined angle in order to control a heating range of an area of the hot air blower. Furthermore, with the half-closed combustion chamber a, the heated air would be less affected by a flow from outside, thereby providing a greater heating range of an area. Also, since the vane mechanism 50 can reduce backflow, thereby enabling a stable flow field inside and outside of the half-closed combustion chamber a and allowing the heated air to be spirally discharged, it would be easier for a user to control a heating range of an area in this regard. Moreover, each of the plurality of guiding vanes 54 is obliquely extended at an angle determined from the rotation speed of the fan mechanism 30, thereby providing a stable spiral flow field, reducing backflow and turbulence and increasing air flow stability and efficiency. Moreover, the air flows at higher speed at a zone radially outward of a center of the spiral flow field and at slower speed at a zone towards the center, and since the flame protector 60 covering the combustion device 40 and the half-closed combustion chamber a is close to the center of the spiral flow field where the air flows slower and plus the provision of the flow-regulating net 52 and vents 63, supply of oxygen and the speed of air can be stably controlled in an internal area of the flame protector 60 when the hot air blower blows a greater amount of air and needs greater combustion. Since the plurality of guiding vanes 54 is disposed away from the center of the spiral flow field where the air flows faster and since the obliquely extended guiding vanes 54 conform to a streamline curvature of the spiral flow field, drag can be effectively reduced to the least, backflow can be effectively reduced and cold and hot air can be mixed thoroughly.

While the specific embodiments have been illustrated and described, numerous modifications come to mind without significantly departing from the spirit of invention, and the scope of invention is only limited by the scope of the accompanying claims.

What is claimed is:

1. A hot air blower comprising:
a shell;
a fuel canister, a fan mechanism, a combustion device, a vane mechanism, and a flame protector disposed within the shell, with the fan mechanism blowing air, with the combustion device including a burning end, with the vane mechanism disposed in a position locating the combustion device between the fan mechanism and the vane mechanism, with the vane mechanism including a clipping seat and a plurality of guiding vanes, with the plurality of guiding vanes extending axially and obliquely from the clipping seat, with the axially and obliquely disposed plurality of guiding vanes preventing the air passing through the vane mechanism from generating turbulence to achieve a flow-regulating effect; with the flame protector and the burning end axially disposed within the vane mechanism, with the flame protector circumferentially surrounding and hooding the burning end of the combustion device, with the flame protector including a lateral wall including a plurality of vents, with the air passing the vane mechanism expelled out of the plurality of vents, with the clipping seat and the flame protector connected together and forming a half-closed combustion chamber therebetween, with heat in the half-closed combustion chamber causing a thermal expansion of the air and thereby increasing a speed and a volume of the air passing the plurality of guiding vanes of the vane mechanism; and
an external flow tube extended out of the shell, with the heated air discharged from the external flow tube which controls a heating range of an area.

2. The hot air blower as claimed in claim 1, wherein the vane mechanism includes a flow-regulating net limiting a flow amount of the air passing the vane mechanism per unit time to achieve a flow-regulating effect, wherein the flow-regulating net is disposed on the clipping seat.

3. A hot air blower comprising:
a shell;
a fuel canister, a fan mechanism, a combustion device, a vane mechanism, and a flame protector disposed within the shell, with the fan mechanism blowing air, with the combustion device including a burning end, with the vane mechanism disposed in a position locating the combustion device between the fan mechanism and the vane mechanism, with the vane mechanism including a clipping seat and a plurality of guiding vanes, wherein the vane mechanism includes a flow-regulating net limiting a flow amount of the air passing the vane mechanism per unit time to achieve a flow-regulating effect, wherein the flow-regulating net is disposed on the clipping seat, wherein the clipping seat includes first and second clipping seats, wherein the first and second clipping seats together hold the plurality of guiding vanes extending obliquely, with the obliquely disposed plurality of guiding vanes preventing the air passing through the vane mechanism from generating turbulence to achieve a flow-regulating effect, wherein the first clipping seat includes a bottom side including a first through hole and a plurality of guide holes, wherein the first through hole is disposed in a central position, wherein the plurality of guide holes is disposed circumferentially around the first through hole, wherein the air flows through the plurality of guide holes and is regulated by the flow-regulating net, and wherein the combustion device is insertably disposed through the first through hole; with the flame protector disposed within the vane mechanism and hooding the burning end of the combustion device, with the flame protector including a lateral wall including a plurality of vents, with the air passing the vane mechanism expelled out of the plurality of vents, with the clipping seat and the flame protector forming a half-closed combustion chamber therebetween, with heat in the half-closed combustion chamber causing a thermal expansion of the air and thereby increasing a speed and a volume of the air passing the plurality of guiding vanes of the vane mechanism; and
an external flow tube extended out of the shell, with the heated air discharged from the external flow tube which controls a heating range of an area.

4. The hot air blower as claimed in claim 3, wherein one of the first and second clipping seats includes a first lateral side extended along a circumference of the bottom side and including a plurality of protruded first clamping sections, wherein another of the first and second clipping seats includes a second lateral side extended annularly and including a plurality of recessed second clamping sections and defining an embedding wall, wherein each of the plurality of guiding vanes includes a recessed hook section and an anti-disengagement protruded hook section on a same side and adjacent to each other, wherein the recessed hook sections of the plurality of guiding vanes are hooked onto the embedding wall, wherein the first and second clipping seats are connected together with the plurality of protruded first clamping sections correspondingly engaging with the plurality of recessed second clamping sections, and wherein the anti-disengagement protruded hook sections of the plurality of guiding vanes are clamped between the plurality of protruded first damping sections and the plurality of recessed second clamping sections to prevent disengagement from the first and second clipping seats.

5. The hot air blower as claimed in claim 4, wherein each of the plurality of guiding vanes includes a recessed limiting section and includes the recessed limiting section, the recessed hook section, and the anti-disengagement protruded hook section on a same side and adjacent to one another, wherein the flame protector includes an end defining an open end and another end defining an air exit end, wherein the burning end of the combustion device is hooded in the open end of the flame protector, and wherein the open end of the flame protector is fixed to the second clipping seat of the vane mechanism.

6. The hot air blower as claimed in claim 5, wherein the plurality of vents is circumferentially disposed on the flame protector and are parallel to one another.

7. The hot air blower as claimed in claim 1 further comprising an internal flow tube disposed within the shell, wherein the combustion device and the vane mechanism are disposed in the internal flow tube, wherein the external flow tube includes a first end fixed to an end of the internal flow tube and a second end extended out of the shell, and wherein the combustion device and the vane mechanism are also insertably disposed in the external flow tube.

8. The hot air blower as claimed in claim 3, wherein the combustion device includes an end connecting with a first fuel line, wherein the vane mechanism includes a heating tube mounted on the first clipping seat, wherein the heating tube includes an end including a fixing end, wherein the heating tube is insertably disposed through and includes the fixing end fixed in one of the plurality of guide holes, wherein the heating tube includes two legs with one leg connecting with the first fuel line and another leg connecting with a second fuel line respectively, and wherein the heating tube is disposed in front of the fan mechanism and aside of the combustion device, with the combustion device giving off heat energy to the heating tube and preventing fuel from becoming condensed and clogged therein.

9. The hot air blower as claimed in claim 3, wherein the first clipping seat includes an ignition wire, wherein the ignition wire is connected with an ignition device, wherein the ignition device produces a flame, and wherein the combustion device includes a catalyst net disposed therein preventing the flame from extending out of the combustion device.

10. The hot air blower as claimed in claim 7, wherein the shell includes first and second shells symmetrically joined to each other, wherein the first and second shells include first and second clamping collars disposed therein, and wherein the first and second clamping collars hold the internal flow tube fixed inside the shell.

11. The hot air blower as claimed in claim 1, wherein the fan mechanism includes a fan, a flow-regulating sleeve, a fan motor, and a shielding cover, wherein the flow-regulating sleeve includes a first end covering the fan, wherein the flow-regulating sleeve includes a second end including the fan motor fixed thereto powering the fan, wherein the shielding cover includes an end attached to the flow-regulating sleeve, wherein the flow-regulating sleeve includes an annular internal wall and an annular external wall including a plurality of fins, wherein the plurality of fins extend obliquely on the internal wall and radially from the internal wall to the external wall, wherein the internal wall delimits a bore including the fan motor tightly fitted therein, wherein the fan motor includes a motor spindle the fan is connected thereto, wherein the fan is rotated upon rotation of the motor spindle, and wherein the shielding cover covers the fan motor.

12. The hot air blower as claimed in claim 1, wherein the shell is substantially T-shaped including first and second extensions transverse to each other, wherein the fan mechanism, the combustion device, the vane mechanism, and the flame protector are disposed in the first extension of the shell, and wherein the fuel canister is disposed in the second extension of the shell.

13. The hot air blower as claimed in claim 3, wherein the flow-regulating net includes a second through hole, wherein the second through hole corresponds to the first through hole, wherein the combustion device is insertably disposed through the second through hole.

14. The hot air blower as claimed in claim 7, wherein the internal and external flow tubes form a gap between junctions therebetween.

15. The hot air blower as claimed in claim 2, wherein the flow-regulating net includes a plurality of meshes.

* * * * *